Dec. 1, 1931.     B F. MIESSNER     1,834,414
ELECTRICAL AMPLIFYING SYSTEM
Filed June 19, 1926     3 Sheets-Sheet 3
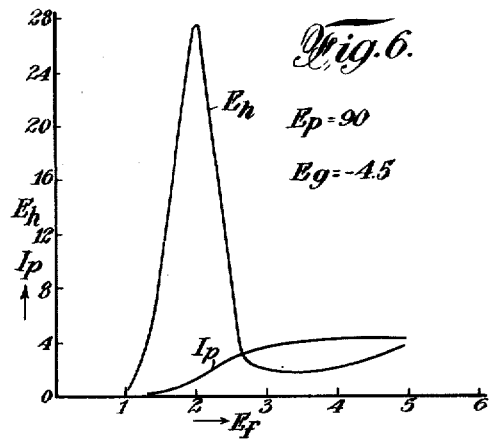
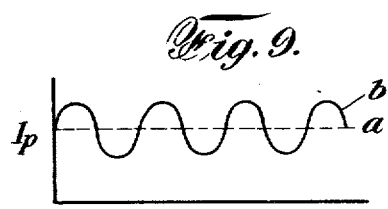
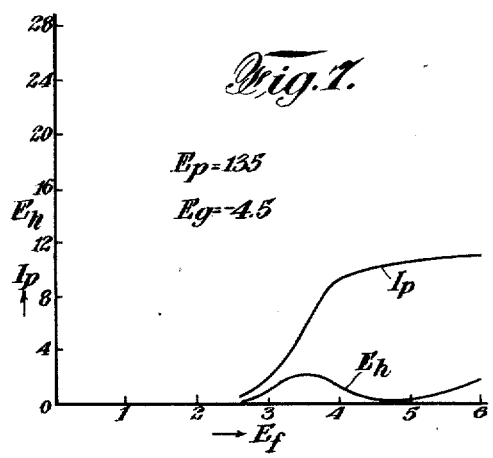
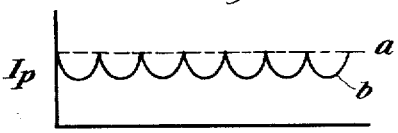
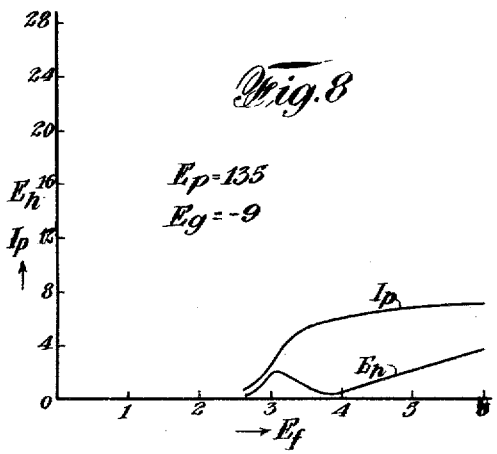
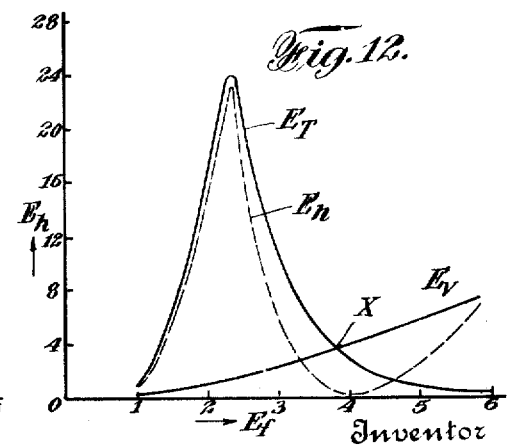
Inventor
Benjamin F. Miessner
By his Attorney Patented Dec. 1, 1931

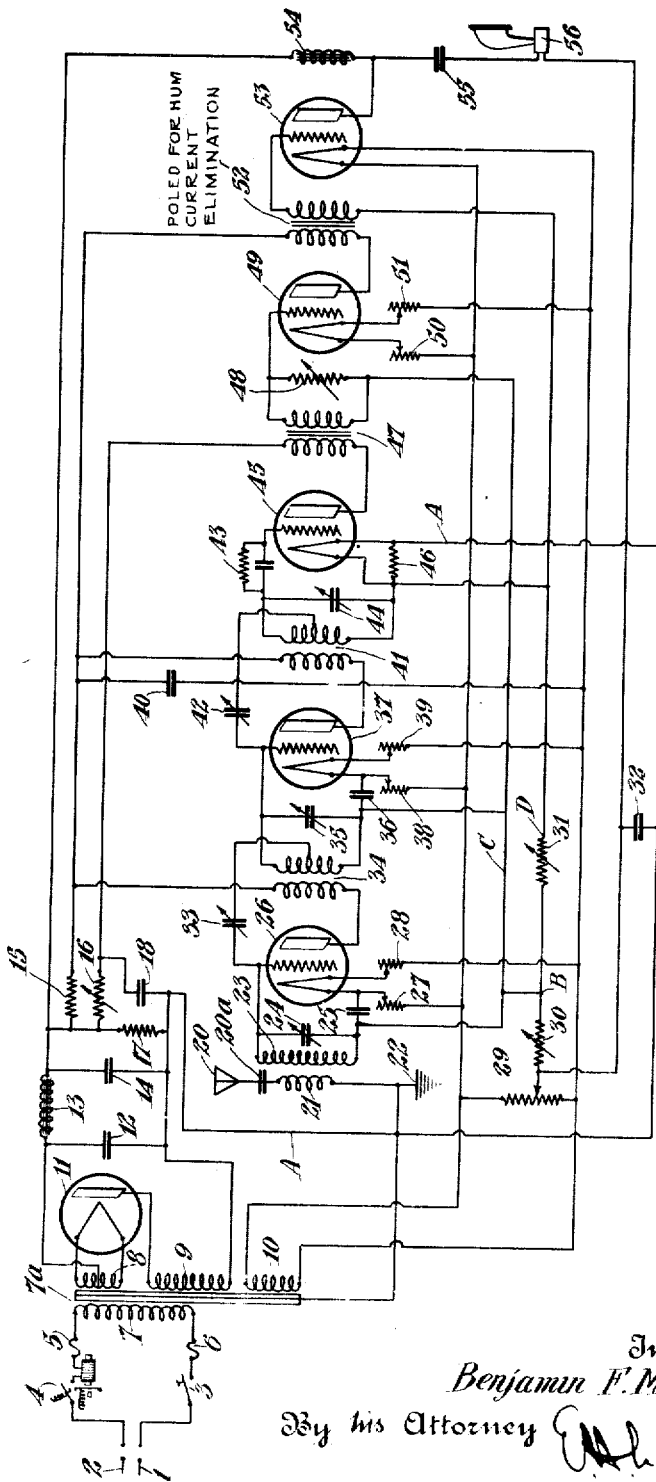

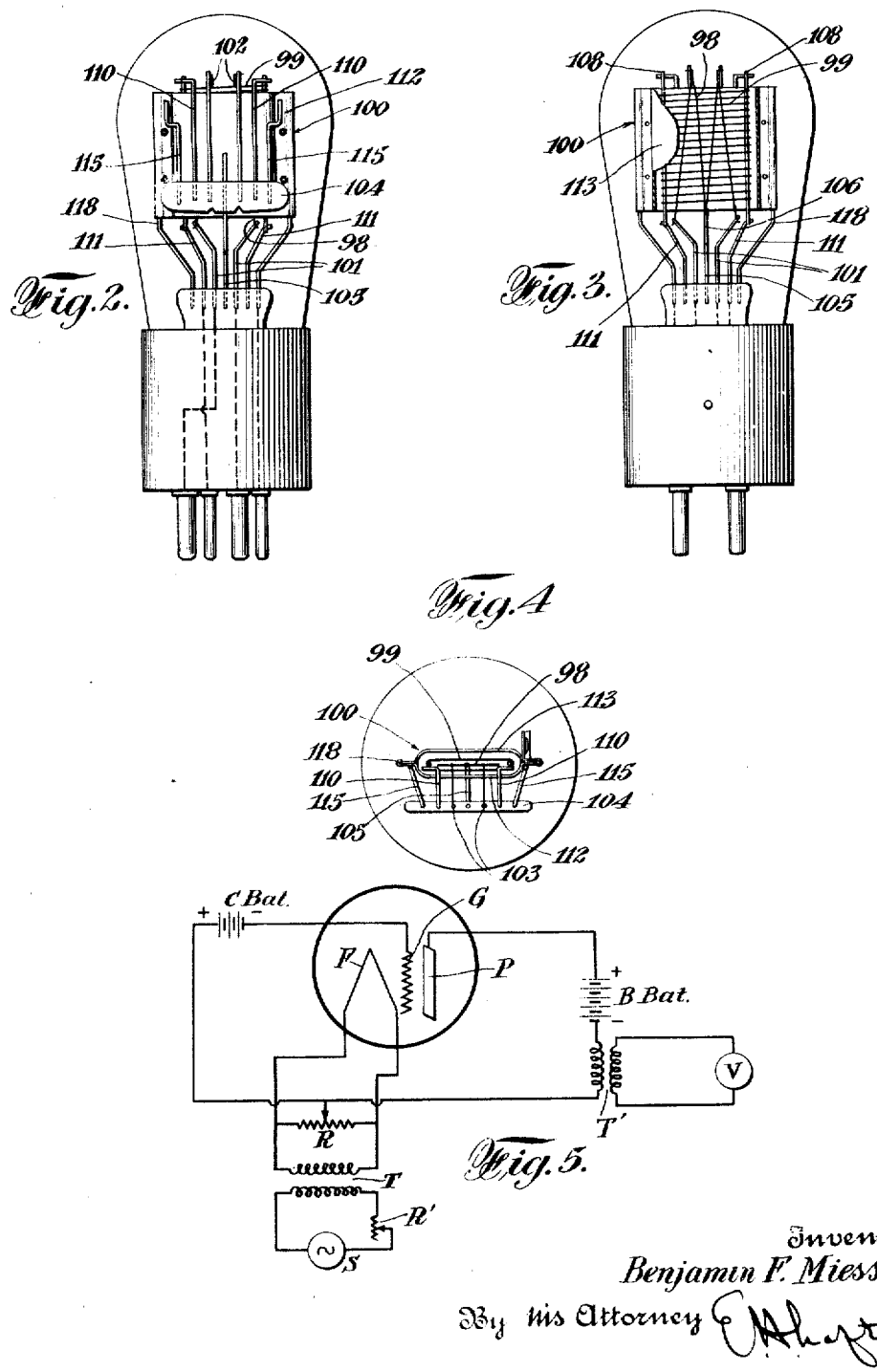

1,834,414

UNITED STATES PATENT OFFICE

BENJAMIN F. MIESSNER, OF SOUTH ORANGE, NEW JERSEY, ASSIGNOR, BY MESNE ASSIGNMENTS, TO RADIO CORPORATION OF AMERICA, OF NEW YORK, N. Y., A CORPORATION OF DELAWARE

ELECTRICAL AMPLIFYING SYSTEM

Application filed June 19, 1926. Serial No. 117,076.

This invention relates to electrical amplifier systems and particularly to such as employ three electrode vacuum tubes as repeaters or amplifiers.

Systems of this character customarily include batteries or other steady direct current generators for energizing the different circuits of the system. Thus, in a radio receiving system it is customary to employ a battery, commonly known as the A battery, to supply the tube filaments with heating current; a battery, known as the B battery, to energize the plates of the tubes; and a battery, known as the C battery, to energize or bias the tube grids. One object of my invention is to provide an improved amplifying system wherein one or more of such steady direct current generators is dispensed with and the energy is derived from a source of unsteady potential, such as the ordinary 60 cycle alternating current or machine generated fluctuating direct current for house lighting. And a further object is to provide a radio receiving system having a plate circuit, filament heating circuit and grid biasing circuit, and wherein all of such circuits are energized from a source of unsteady potential, and wherein no battery or other steady direct current generator is employed in the system. A further object is to provide an amplifying system of this character wherein the employment of the source of unsteady potential does not create any disturbing effects in the system nor, in the case of a radio receiving system, does the employment of such a source create any hum or other disturbance which interferes with or masks the audible signal impulses transmitted through the system.

In the preferred embodiment of my invention, herein illustrated, I disclose a radio receiving system employing a plurality of radio frequency amplifying tubes, a plurality of audio frequency amplifying tubes and a detector tube.

The filaments of the amplifier tubes are heated by alternating current derived from alternating current supply mains. Heretofore the heating of filaments by alternating current has resulted in disturbances in the system which produce an excessive audible hum. I have discovered that by employing tubes of a certain form and construction, particularly with respect to the character of the filament used, that these disturbances can to a large extent be eliminated. I have also discovered that by operating the tubes at certain plate, grid and filament potentials I am able still further to reduce the disturbing effects and at the same time to secure the desired amplification of the signaling impulses. A further object of my invention therefore is to employ in such a system vacuum tubes which are especially designed so as to reduce to a minimum any hum produced in their output circuits because of the alternating current in the filaments of such tubes and further to operate these tubes at such plate, grid and filament potentials that the resulting hum produced is a minimum.

The filament of the detector tube in the illustrated form of my invention is heated by current flowing in the various plate circuits of the system. This current is derived from the alternating current supply mains through a rectifier and filter. The direct current produced by the rectifier and filter passes through the plate circuits of the various tubes in parallel and the currents from the individual plate circuits combine in a common return path, or circuit, to the filter. In this return path is included the filament of the detector tube. Also in the preferred embodiment of my invention I connect the grids of the several tubes to points of suitable potential in the return circuit from the plates and in this manner obtain the proper biasing voltage for the grids of the different tubes. The particular form and arrangement of these several circuits as well as the special advantages which their use secures, will be more particularly pointed out in the following description taken in connection with the accompanying drawings, wherein, Figure 1 illustrates diagrammatically a five-tube radio receiving system embodying one form of my invention.

Figures 2 to 4 inclusive, are respectively opposite side views and top plan view of a vacuum tube which I employ in my system for certain stages of amplification.

Figure 5 is the circuit diagram of an apparatus for determining the amount of hum produced in the output circuit of a vacuum tube when the filament is heated by alternating current.

Figures 6 to 8 inclusive, are curves illustrating the results of hum tests on tubes of different types, and Figures 9 to 12 inclusive, are curves explanatory of the effects produced when alternating current is used for heating the tube filament.

The radio receiver illustrated in Figure 1 is what is commonly known as a neutralized 5-tube radio frequency receiver in which the three-electrode vacuum tubes 26 and 37 are radio frequency amplifiers, the vacuum tube 45 is a detector and the vacuum tubes 49 and 53 are low or audio frequency amplifiers. At 20 is shown an antenna for collecting radio signaling energy, having a variable condenser 20a, and a primary winding of a transformer 21 in series therewith; the antenna being grounded at 22. The secondary winding 23, cooperating with the variable condenser 24 permits of tuning the grid circuit of vacuum tube 26 to the frequency of any desired incoming signals. The second vacuum tube 37 is selectively associated with the first vacuum tube through the transformer 34 and variable condenser 35. The detector tube 45 is selectively associated with the second radio frequency tube through the transformer 41 and the variable condenser 44, the element 43 being the usual "grid leak-stopping condenser" combination employed in connection with detector action. The first audio frequency amplifier 49 is associated with the detector tube through a suitable audio frequency transformer 47, shown to have a resistance 48 connected across its secondary winding, this being one of the usual methods in the art to assure stable operation of an audio frequency amplifier. The second audio frequency amplifier tube 53 is associated with the first audio frequency amplifier through a suitable audio frequency transformer 52. A loud speaker or other suitable signal translating device 56 is energized by the final highly amplified signal currents from the final amplifier 53, through a capacity coupling condenser 55, which prevents direct current from flowing in the winding of the translating device to interfere with a predetermined polarizing of the magnetic system thereof, a serious matter in the case of the plate current required for a power amplifying tube, the signal currents being diverted to the translating device through the condenser 55 by action of the choke coil 54 in the plate circuit of the vacuum tube 53. The two radio frequency stages are shown to be neutralized against oscillation production or excessive regenerative amplification caused by plate circuit reaction on the grid, through the internal capacity of the tube, through having variable condensers 33 and 42 connected to the grids of their respective tubes from a tap connection to the secondary winding of the transformers in the plate circuits of these tubes, this being a method in common use in existing commercial receivers for neutralizing for such reaction.

I find that the variable condenser 20a in the antenna circuit is of particular advantage in controlling the amount of received signal energy which is delivered to the amplifying system of the receiver, thus permitting the operator to control the intensity or volume of signal sound delivered by the loud speaker 56.

For the purpose of supplying energy to the system for amplification and detection of the signals received, I show at 1 and 2 the terminals of an alternating current supply system such as the usual house lighting system, across which is connected the primary 7 of an alternating current transformer. Connection between the primary and the supply system may be by a plug inserted in an ordinary house lighting socket. A suitable push switch 3, together with an automatic cutoff 4 and fuses 5 may be included in a line leading to the primary 7 of the transformer, which transformer would for ordinary 60-cycle alternating current have an iron core 7a, which iron core is preferably grounded, as shown, to the ground connection 22. A secondary 10 of the supply transformer, usually of the step-down character for house-lighting current characteristics is the source of energy for heating the filaments of all of the vacuum tubes except the detector tube 45. The transformer secondary 10 is designed to give sufficient voltage for the filament of tube 53, which, being the last stage amplifying tube, may be a more powerful tube and desirably require higher filament voltage than the preceding tubes. I connect the lower filament voltage tubes 26, 37 and 49 across the terminals of this same transformer by using the resistances 27 and 28, 38 and 39, and 50 and 51, in each leg of the filament connections of these respective tubes, the adjustments of the resistances shown permitting securing the desired voltage across these filaments as well as assuring equalizing the potential drop through the connections to the filament. This therefore provides for energizing or heating the filaments of all of the tubes except the detector tube 45 from an unmodified alternating current source, thereby avoiding the use of the so-called "A" battery for these filaments. The manner in which the filament of the detector tube 45 is energized, and the reason therefor will be explained later.

The energy for exciting the plate circuits of the vacuum tubes is derived from the alternating current supply transformer through the secondary winding 9, which, for the ordinary characteristics of lighting supply of alternating currents, would be of the step-up form, say from 110 volts to about 450 volts. This alternating current energy is applied to a rectifier 11, shown as a two-electrode vacuum tube rectifier whose filament is heated by energy derived from a third secondary winding 8, of step-down character to give the required voltage for the filament of the utilized rectifier tube. The alternating current from the winding 9 is rectified in a manner well understood in the art and applied to the terminals of a filter formed by the two large capacity condensers 12 and 14 connected through a large inductance coil or choke 13, the filter acting in a well known manner to smooth out to a substantial degree half wave impulses resulting from rectification. It is, of course, understood that two rectifiers could be used to rectify both halves of the alternating current cycle giving what is known as full-wave rectification if desired, but I find that the present arrangement is more economical and is quite satisfactory in operation. The smoothed-out rectified current is applied across the terminals of a high resistance 17, and I connect the plate of the final high power tube 53 across the terminals of this resistance to give the full voltage of the filter system to the plate circuit of this last tube; I having employed as high as 350 volts for this purpose. I connect the plates of the amplifier tubes 26, 37 and 49 across the resistance 17 through a series resistance 15 across which there is a drop of potential in order to apply a lower plate voltage to these tubes, as it is not generally necessary to use power tubes in these stages, and the type of tube I use may not be designed to stand the higher plate voltage of the final power tube. I have used about 150 volts on the plates of these three amplifier tubes. I connect the plate of the detector tube 45 across the resistance 17 through another series resistance 16, this resistance being chosen to give a drop of potential which will reduce the voltage on the plate of the detector tube to the desired amount, usually about 45 volts. As the resistance of 16 is quite high, I shunt it and the resistance 17 by a condenser 18 of fairly large capacity to permit by-passing high frequency and low frequency signal currents. It also acts further to filter or smooth out the ripples in the converted plate current energy supply. A similar condenser 40 shunts the resistances 15 and 17. The circuit through this condenser may be traced from the right hand terminal of resistance 15 through condenser 40, the lower half of potentiometer 29, resistances 30 and 31, filament of detector tube 45 back to the lower terminal of resistance 17.

It is thus seen that the plate circuits of all of the vacuum tubes are energized from the alternating current source, thereby eliminating the use of so-called "B" batteries, and that the arrangement provides for obtaining plate voltages of different degrees to energize the several vacuum tubes in accordance with the particular function they perform.

It is seen that the plate circuit current of all of the vacuum tubes come together or combine in one line A below the filter system, and by following this line through the diagram it will be seen that it passes through the filament of the detector tube 45, and thence to a contact on potentiometer 29, connected across the filament supply line, the current in proceeding to the contact on potentiometer 29 having to pass through resistance 31 and 30. In this way I utilize the plate current of the tubes in the system to energize or heat the filament of the detector tube 45, and to this end I choose a detector tube which has a filament current consumption for normal operation approximately equivalent to the total plate current utilized in all of the vacuum tubes, though it would be possible to utilize the plate current in less than all of the tubes. If desired, I may employ a resistance 46, which may be adjustable, across the filament terminals of the detector tube 45 of such proportion as to regulate the amount of current passing through the filament from the plate circuit system to the desired degree. It, of course, is understood that I may under certain conditions and if desired substitute a battery, or other source of substantially steady direct current, for heating the filament of the detector tube in lieu of employing the current from the plate circuit system.

Since the resistance 17 across the filter circuit is very high in value practically the only current drain on the filter is that doing useful work in the plate circuits of the several tubes, and by reducing the potential for the detector tube and low power amplifying tubes through series resistances 16 and 15 respectively, I eliminate the usual so-called "loss current" low resistance usually employed in shunt to the filter as a potential divider. This elimination of "loss current" and any other unnecessary current drain on the filter system is very important, for obviously the less the current drain on a filter the better the filtration for a given quantity of filter material, it being readily apparent that at no load the filtration is substantially perfect and decreases in perfection as the load increases.

It is further seen that my inclusion of the grid bias resistances 30 and 31 in the common return outside of the filter does not increase the current drain on the filter as is the case when reliance is had on a "loss current" resistance in shunt to the filter for the required biasing potential. It will also be noted that the current I use for heating the detector filament is so obtained as not to increase the current drain on the filter.

When the filament of a vacuum tube is excited from a source of current which varies through a wide range, as is the case with alternating current, the temperature variations with resulting variations in electron emission become quite substantial, with the result that substantial fluctuations in the plate circuit current are created from this cause. Also, where the grid circuit must necessarily be connected to the filament system, and where the filament supply potential varies through wide range, it is difficult to prevent these potential fluctuations from being manifested on the grid, and therefore creating another source of plate circuit current variations. Since the detector tube is the first tube in the system to be connected to the low frequency amplifying portion through a low frequency transformer, which thereby efficiently permits the low frequency variations of the alternating current source to be passed on to the low frequency amplifying portions, and since the low frequency amplifying portion often comprises two or more stages following the detector, any variations in the detector system are highly amplified in the subsequent stages of the system. It is for this reason that systems employing alternating current as a source of energizing the vacuum tubes have not heretofore met with success in those attempts to employ a vacuum tube as a detector having its filament, like the other tubes of the system, energized by alternating current. While the combined plate currents of all the tubes which I pass through the filament of the detector tube is not entirely steady, including as it does the ripples left by incomplete filtration, together with variations representing both high and low frequency signal energy, yet the major portion of the current is of direct nature, having these ripples and variations superimposed on the surface, so to speak, and therefore of small magnitude compared to the main body of the current with the result that the arrangement is most satisfactory towards eliminating a heretofore serious difficulty in connection with alternating current energized systems. I find that a tube now commercially available requiring .06 amperes to heat the filament approximately coincides with the current I have found available from the several plate circuits of one of the systems I have built.

To avoid the use of the so-called "C" batteries to obtain an initial potential or bias on the grids of the tubes, as is the practice in the adjustment of three-electrode vacuum tubes to act as amplifiers with little or no distortion, as before stated, I cause the combined plate currents of the system to pass, after passing through the filament of the detector 45, through resistances 31 and 30 in proceeding to the filament system through the contact on the potentiometer 29 across the filament supply leads. The combined plate currents in passing through these resistances create differences of potential between the filament system and the opposed terminals of the resistances. Since I do not require as high grid bias on the amplifying tubes 26, 37 and 49, which are excited with less potential on the plates as is required for the power tube 53, which is excited with less potential on the plate, I connect these low power amplifying tubes to the point B through the common connecting wire C, the resistance 30 being adjusted to give the desired drop of potential to create the desired grid bias for these tubes. To obtain a higher grid bias for the power tube 53 I connect its grid to the point D, adjusting the resistance 31, the combined drops of potential across the resistance 30 and 31 giving the required grid bias for the power tube. It will be seen that by employing the drop of potential created by the combined current of the plate system, resistances of smaller value are required to give the necessary drop of potential than would be the required value of resistances if the grid bias for each tube was had by utilizing the individual current of that tube passing through a resistance. These resistances constitute coupling elements capable of transferring energy from plate circuit back to grid circuit in the several tubes, as well as from a succeeding tube back to a preceding tube, and are, therefore, elements tending to make the system unstable by regenerative effects if provision is not made for keeping these effects to practical low limits. A step toward this end is accomplished by utilizing, as before stated, the combined current to create the drop of potential, thereby making the resistance low and therefore the resistance coupling low. Also a condenser 32 of large value is connected so as to short-circuit the resistances 30 and 31 and filament of tube 45, thereby permitting ripples and variations to avoid these resistance elements through a low impedance path, further reducing the coupling effects, so that it is principally the main body or steady portion of the combined plate current that passes through the resistances 30 and 31. This condenser 32 also has the effect of short-circuiting the varying component of the combined plate current from the filament of the detector tube 45, thereby making the detector tube less susceptible to creating the plate circuit variations heretofore discussed. I also find it desirable to offset to some extent in the radio frequency amplifiers the coupling created by the resistance 30 and to do so I employ by-pass condensers 25 and 36 between the filaments and the tuned portions of the grid circuits, these by-pass condensers acting to prevent high frequency currents which might be fed back from reaching the grids. I find that the use of these by-pass condensers facilitates neutralizing the system by means of the condensers 33 and 42 previously referred to.

The detector tube is usually operated without any substantial grid bias. I have shown the grid of the detector tube 45 connected directly to the filament instead of across a resistance creating any substantial drop of potential, as is the case with the amplifier tubes.

It will be seen that I have shown a system completely energized for its amplifier and detector functions from a source of alternating current. Its operation as a radio receiver will be briefly described. The high frequency radio signaling energy is collected on the antenna 20, and controlled in amount by the variable condenser 20a, the high frequency energy thus controlled in degree being transferred to the radio frequency amplifier 26 through the secondary coil 23 cooperating with the tuning condenser 24. After being amplified by the vacuum tube 26, the high frequency energy is transferred to the high frequency amplifier 37 selectively by means of the transformer 34 and the tuning condenser 35. The neutralizing condenser 33, being properly adjusted and in cooperation with its tap-off from the secondary winding of transformer 34, prevents the reaction of the amplified currents in the plate circuit of vacuum tube 26 from creating oscillations in this tube and its circuits. Likewise, the neutralizing condenser 42 and the corresponding tap-off prevent the high frequency amplified currents in vacuum tube 37 from reacting to cause oscillations. The high frequency amplified currents are transferred from the plate circuit of vacuum tube 37 to the detector tube 45 selectively through the transformer 41 and the tuning condenser 44. The high frequency currents are distorted by the detector tube 45, and pass through the audio frequency transformer 47 as low frequency current representing the desired signals into the first audio frequency amplifying tube 49, and thence through audio frequency transformer 52 to the power amplifier tube 53, in whose plate circuit is located a high impedance choke coil 54, which permits the energizing of the plate of the tube from the filter, but is most effective in diverting the desired signal currents through the high capacity condenser 55 into the loud speaking or other suitable translating device 56.

An important object of the invention is to effectively eliminate from a system completely energized from an alternating current source, so far as the translating device is concerned, currents or disturbances which result in objectionable "hum." A substantial step toward this end is made in energizing the filament of the detector tube by the substantially steady direct current of the combined plate circuits. The radio frequency tubes do not require the extreme precautions to prevent them from creating low frequency variations as does the detector tube, because the radio frequency transformers interlinking these tubes, and interlinking the last radio frequency tube to the detector, do not effectively transfer these low frequency variations from tube to tube for further amplification. However, it is necessary to keep the variations in these tubes within limits, as there is coupling between these tubes and the detector and audio frequency tubes which can to some degree pass low frequency variations down the line, this coupling being through the filter system. For instance, if temperature variations and grid variations take place in the first radio frequency tube 26, low frequency variations are created in the plate circuit of this tube which pass through resistance 17 and condenser 14, for instance, which are in common with the plate circuit of the detector tube 45, and therefore through this common connection or coupling create like variations of reduced intensity in the plate circuit of detector tube 45, and are therefore transferred by the low frequency transformer 47 to vacuum tube 49 and then to vacuum tube 53, thus being twice amplified. This is not as serious as low frequency variations created in detector tube 45 initially, yet is of sufficient moment to require precautions as to the radio frequency tubes. One step taken towards keeping the variations in the radio frequency tubes low is also common to the two audio frequency amplifiers, and comprises connecting the grid circuits to the wire leading to a contact on potentiometer 29. By keeping this contact approximately at the center of the potentiometer 29, it is approximately at a point of no change of potential with respect to the alternating current applied to transformer secondary 10 and therefore the grids of the amplifying tubes do not substantially vary in potential due to use of alternating currents. However, as will be later described, the contact is not adjusted exactly at the mid point or point of no potential variation for a definite reason.

Another step toward preventing low frequency disturbances, particularly such as are produced by the use of alternating current for heating the tube filaments, relates to the use of tubes having certain characteristics and to the operation of the tubes at certain conditions of plate, grid and filament potentials.

I find that a tube of the form and size disclosed in Figures 2 to 4, inclusive, is well adapted for operation with alternating current in the filament circuit and is used in the radio frequency stages and the first audio frequency stage of the system disclosed in Figure 1 greatly improves the non-hum-producing character of the system. This tube comprises a filament 98, grid 99 and plate 100. The filament 98 is formed of oxide coated wire designed for operation at a dull red heat. At five volts the filament takes .5 amperes. The filament has the form of an inverted W, the ends of which are connected to leading in wires 101 sealed through the glass neck of the tube. The top bends of the filament are supported by downwardly extending hooks 102 formed of fine wire, which are secured at points above and to one side of the filament to vertical supporting wires or rods 103 which are sealed at their lower ends in a side glass member 104. Wire 105, sealed in the neck of the tube and in the glass member 104 assists in maintaining the member 104 in position spaced from and at one side of the plate 100. A wire 106 connecting the middle bend of the filament 98 with the wire 105 holds the middle bend of the filament in position.

The grid 99 which surrounds the filament is a flat coil of fine wire wound on the spaced vertical rods 108, the upper ends of which are held in position by wires 110 carried by the glass member 104. The lower ends of the rods 108 are secured to the wires 110 which are sealed in the glass neck; one of the wires 110 extending through the neck and forming the leading in terminal of the grid.

The plate 100 which is spaced from and surrounds the grid 99 is formed of two thin sheet metal side members 112 and 113 bent toward one another and joined together near their side edges. The plate 100 is supported at its top by rods 115 which are carried by the glass member 104 and the outer edges of the sheet metal members 112 and 113 are pinched around wires 118 which extend downwardly and are sealed into the glass neck of the tube. One of the wires 118 extends through the neck and forms the leading in terminal of the plate.

In practice when the tube shown in Figures 2 to 4 is employed as radio and audio frequency amplifiers, such as tubes 26, 37 and 49 of Figure 1, I preferably operate those tubes at a plate voltage of approximately 135, a grid voltage of approximately −4.5 and a filament voltage of approximately 4.5.

For the purpose of determining what form of tube is best adapted for use as an amplifying tube in the system shown in Figure 1 or in other systems wherein the filament of the tube is heated by alternating current; particularly with a view to reducing low frequency disturbances or hum in the output circuit and also to determine what variations may be produced in the intensity of the hum in the output circuit by varying the plate, grid and filament voltage, I have made use of the apparatus illustrated diagrammatically in Figure 5. In this figure I illustrate the tube under test as having the so-called "hair-pin" shaped filament F, grid G, and plate P. The grid circuit includes a biasing battery, C Bat, and the plate circuit includes the energizing battery, B Bat. There is also shown connected to the plate circuit through a transformer T' a suitable volt meter or other instrument V for indicating variations in plate current in a quantitive manner which I will hereinafter refer to for convenience as hum voltage. I show the filament F energized from an alternating current source S through a transformer T and the grid and plate circuits are connected to the filament through a potentiometer R having a variable contact.

I have observed the hum effects as indicated by the volt meter V in the case of a number of vacuum tubes of commercial design and will illustrate and describe the results of observations in two typical types of tubes. In these observations I used unusual care to connect the grid to the center point of the potentiometer R in order to eliminate variations in the potential of the grid G. The exact character of these variations will be more fully pointed out and explained hereafter, in connection with Figure 9 of the drawings.

Figure 6 illustrates the results of tests made upon one type of tube. This tube had a very thin filament designed to operate at white heat with about three volts across the filament terminals and .06 amperes through the filament. The filament was of the straight type instead of bent or hair pin-shaped. In Figure 6 abscissæ represent filament alternating voltages across the filament terminals of the tube, the filament voltage being varied by adjustment of the variable resistance R' shown in Figure 5. Ordinates in Figure 6 represent resulting plate currents as the filament voltage is varied for a given plate potential and given grid bias. In this case the plate potential was 90 volts and the grid bias −4.5 volts which are the normal operating voltages for the tube as an amplifier. The curve $I_p$ shown in Figure 6 is the usual plate current characteristic curve, in this case being that due to the change in the filament temperature through change in filament potential. The curve $E_h$ represents the intensity of hum as measured by the volt meter V connected to the plate circuit as shown in Figure 5. It is seen that the hum becomes a maximum early in the stage of increasing the filament voltage at about the point where the plate current characteristic curve is steepest, then rapidly falls off to a minimum at about 3½ volts, and then increases as the filament voltage is increased beyond the normal operating value.

Figure 7 represents the results obtained with another type of tube viz., the tube illustrated in Figures 2 to 4. The curves were taken with the normal operating plate voltage of the tube of 135 and normal grid voltage of $-4.5$. The volts in Figure 7 are drawn to the same scale as in Figure 6. It is seen that the plate current, as represented by the characteristic curve $I_p$, was considerably in excess of that of the first tube. The resulting hum is represented by the curve $E_h$, and it did not reach a maximum until the filament voltage was increased to about 3½ volts, but again the maximum occurred at about the midpoint of the steepest portion of the plate current curve. At about 4½ volts the hum decreased to practically zero value, as compared to the first tube which had a minimum value about equal to the maximum value of the second tube, the first tube's maximum value being about 9 times that of the maximum value of the second tube. After reaching the practically no value at 4½ volts the hum increased slowly up to and through the normal operating filament voltage. It will thus be seen that the second tube offers far superior characteristics for operating with alternating current on the filament than does the first tube, and further that the point of minimum hum with the second tube occurs at 4½ volts, which is quite near the normal 5 volt point of operation, and which difference does not change the amplifying ability of the tube to any objectionable degree, while with the first tube the minimum occurs at about 3½ volts, which is quite well removed beyond the normal operating voltage and would make a substantial difference in the life of the tube.

Figure 8 represents a measurement made with the same tube as Figure 7, but in this case the grid bias was changed from $-4.5$ to $-9$ volts. It will be seen that this change of grid voltage reduced the plate current, as shown by the plate current characteristic curve $I_p$, and also showed the steepest part of the characteristic curve to be had at a lower filament voltage. It is seen from the hum curve $E_h$ that the hum was as before a maximum at the steepest portion of the curve. Further that the point of minimum hum occurred short of 4 volts and did not reach zero value, and thereafter rose quite rapidly, so that the hum at the 4½ volts of Figure 7 was in Figure 8 quite substantial.

I have found by experiments involving changes of plate current on the same tube that hum curves can be obtained not nearly so favorable in their characteristics as the one shown in Figure 7, and by numerous measurements of various tubes have found that the particular one with the particular adjustments of Figure 7 presents the most favorable characteristics for hum elimination of the commercial tubes now available.

While I do not wish to limit myself to any specific theory in explanation of the varying hum effects which I have observed in different tubes and under different operating adjustments, my experience leads me to believe that certain definite conditions contribute to a large extent toward the production of such effects.

In considering the effect which will be produced in case the grid is connected to some other point of the alternating current filament supply circuit than the neutral point, that is, in case the contact of the potentiometer R in Figure 5 is positioned at some other than the midpoint of the potentiometer resistance, the grid will, in this case, be subjected to a varying potential relative to the filament.

In Figure 9 I represent by the dotted line $a$ the steady current $I_p$ that would flow in the plate circuit with a given steady potential of the plate or B battery for some steady grid bias of the grid or C battery, if the filament were energized by a steady source of potential. However, with the filament energized from an alternating current source of potential, there will be fluctuations of grid potential due to the connection of the grid to the filament unless the connection is made to the potentiometer R so precisely in the midpoint that there is no variation of potential at that point. If the contact is made either to the right or left of the midpoint the grid potential will vary in amount depending upon the removal of the contact from the exact midpoint, and cause the plate current to vary in the manner represented by the curve $b$ in Figure 9. It is apparent that if the contact is to the right of the midpoint the variation in the plate current will be in opposed phase to those which would occur if the contact were to the left of the midpoint. It is to be noted that by adjusting the contact I can control the degree and the phase of variations arising from this source. It is seen that the variations in the plate current are of the same frequency as the alternating current source. The volt meter V connected to the plate circuits will give an indication of the hum voltage resulting from this cause.

I will now consider what I deem to be a second cause for variations in the plate circuit. The amount of plate current depends upon the rate at which electrons reach the plate P from the filament F. The number which reach the plate of course depends upon the number of electrons available. Since there is an alternating difference of potential applied to the filament, it is apparent that one leg of the filament is alternately positive and negative with respect to the other leg, with instances of no difference of potential between the legs as the alternations take place. When the right hand leg, for instance, is positive I have reason to believe that this leg attracts and absorbs some of the electrons emitted by the left hand negative leg, and vice versa, so that twice during a cycle of alternating current the plate is robbed of some of the available electrons, and the current in the plate circuits accordingly reduced. Likewise, twice during a cycle when both legs of the filament are neutral, there is no robbing from the plate, and the plate current is allowed to become normal. This is shown in Figure 10 where the dotted line $a$ represents the normal steady plate current, and the curved lines $b$ below $a$ represents the impulsive reduction of the plate current due to the robbing effect. It will be seen that this effect occurs at double the frequency of the alternating current. This effect can be controlled in degree by the design of the filament as well as the potential of operation of filament voltage for any given design. If the filament, instead of being hairpin in shape, as shown in Figure 5, is spread out more or less even to a straight wire, as is the case in the construction of some commercial types of vacuum tubes, the effect is reduced by thus increasing the distance over which the alternating difference of potential must act. Also if the filament is designed to employ low voltage across its terminal with high current for heating, the difference of potential between points in the filament is thereby reduced, thus reducing the effect. Again, if the filament is designed to operate with a given normal potential, operating it at some point below this normal potential will reduce the robbing effect. Also the robbing effect will depend upon the relative values of the plate voltage and the voltage across the filament terminals. If the plate voltage is large compared to the voltage across the filament terminals, the force arising in the plate to draw the electrons to the plate will correspondingly predominate over the forces acting between the two legs of the filament. I have also noted that the amount of grid bias influences the effect, this being probably due to a negative grid bias having the effect of stopping electron flow to the plate, which is in effect a reduction of plate voltage, and thereby allowing the robbing effect to become more pronounced.

Considering a third effect due to energizing the filament from an alternating current source, it is well known that the number of electrons emitted from a filament of a given substance depends upon its temperature, the higher the temperature the more electrons emitted. With the filament energized by an alternating current there is some tendency for the filament to vary in temperature twice during each cycle as the current changes from positive to negative through zero or no current, thereby changing the number of electrons available for flow to the plate. I have shown this effect in Figure 11 where the dotted line $a$ represents the steady plate current $I_p$, which would flow under fixed conditions, and the rising impulses that occur due to increase of electron emission with temporary variation by the curve $b$. It will be noted that the robbing effect just discussed occurs when the alternating current cycles are at a maxima, and tend to reduce the plate current, while the temperature effects which occur at these maxima tends to increase the plate current, thereby giving rise to the possibility of the robbing effect being offset or overcome by the temperature effect. It is quite possible that there is a tendency of the temperature effect to lag behind its cause more than in the case of the robbing effect, so that the two effects are not precisely in opposed phase, but my observations have been that there is sufficient opposition of phase to make it possible to utilize one against the other. The temperature effect is subject to control, particularly through the design of the filament. If the filament is of fine wire operated at quite high temperature, as is the case with some commercial tubes, the electron variation due to temperature change is most marked. This may be reduced by increasing the diameter of the filament to permit of operating at lower temperature, and yet maintain the desired amount of electron emission by increasing the surface area. This increase in the size to maintain equality of emission has the further beneficial effect of increasing the mass, which aids in maintaining high temperature inertia. This increasing of size is also helpful towards reducing the robbing effect because it means that lower voltage may be used across the terminals of the filament. This, of course, requires the use of larger currents, and while this would be a decided disadvantage in battery operation, it is no disadvantage whatsoever in alternating current operation, it being a matter of simple design of transformer to give any desired current with no ill effects from having the current large.

In Figure 12 I endeavor to illustrate what appears to me to be a plausible explanation of the investigations I have made of the hum characteristics of numerous tubes, the explanation being based upon the robbing effect explained in Figure 10, in conjunction with the temperature effect explained in Figure 11. I conceive that as the filament voltage is increased the temperature effect may be represented by the curve $E_T$ of Figure 12, the temperature effect being a substantial maximum early in the increasing of the filament voltage and falling away to a low value as the voltage is further increased, the maximum occurring where the characteristic curve is steepest and thus where a small change in the conditions makes the greatest change in the plate current, and becoming less as the characteristic curve flattens out, so that small change in the conditions makes no very great change in the plate current. I also conceive that as the filament voltage increases the robbing effect increases for two reasons, (1) greater emission makes more electrons available to the robbing effect and (2) higher voltage across the filament renders the robbing effect more powerful. Thus I conceive that the hum resulting from this effect can be represented by the curve $E_v$, showing the effect to steadily increase with filament voltage. Now I have shown in Figures 10 and 11 how the two effects may be opposed, and I conceive that with tubes having the right characteristics, it is quite possible for the two effects to be equal and opposed at some point X, with the result that no hum is produced from these two causes at this point. I conceive that the two effects may well combine to produce the dotted hum curve $E_h$, this corresponding quite well to the curve I have found by actual investigation as represented in Figure 7.

It will thus be seen that a very satisfactory tube is one arranged to have the lowest possible temperature variation conditions and the lowest possible robbing effect conditions, so that, referring to Figure 7, the minimum might be further broadened so that the particular tube could be operated at a normal filament voltage for maximum amplification with no resulting hum. Such a result is readily realizable in a tube having a filament designed to work with about ½ volt and 2 amperes current, with sufficient surface to give substantial electron emission at a rather low temperature and sufficient mass to keep the temperature inertia quite high at this helpful low temperature, and having a straight or suitable form of filament so as to reduce to a minimum the robbing effect by separating points of the filament having substantially different potentials as far as possible from one another.

In the system shown in Figure 1, I have explained that the detector tube 45 has its filament operated by the direct current from the combined plate currents of the system, therefore it is not generally necessary to take the precaution of using a tube having the characteristics just explained. The power tube 53 which I use need not necessarily have particularly these characteristics, and this tube may produce the variations in the plate current which I have described. Because, this being the last stage of amplification the variations are not further magnified and are therefore within control. I find that these variations in the last tube can be neutralized to a desirable extent by introducing into the grid circuit of the last tube variations arising in the preceding tubes of a like character, and so introducing these variations that they are out of phase with the variations produced in the last tube. This is easily done by controlling the polarity of the connections in some part of the system, such as audio frequency transformer 52. I find that with the connections to audio frequency transformer 52 of an unfavorable polarity the hum may be excessive, that is when the variations from the preceding stages are in phase with or in step with those produced in the last tube. With the polarity reversed the hum is reduced, and by making the proper adjustments the two variations can be regulated to have substantially equal values so that hum is substantially eliminated. To this end I find that the contact of the grid leads on potentiometer 29 is most helpful, as well as the variable resistances 27 and 28 in filament leads to tube 26, 38 and 39 in filament leads to tubes 37 and 50 and 51 in filament leads to tube 49. By regulating these, I can change the amount of variation had, as well as the phase, and find that the variations in the last tube can be nicely compensated for by these adjustments. Such adjustment results in the contact on potentiometer not being placed at the midpoint. It is, of course, not necessary to leave these adjustments variable for the final operator of a commercial radio set, as these adjustments can be established in the fabrication of the set and left in fixed form.

While I have disclosed as one embodiment of my invention a radio receiving system it will be understood that my invention in its more general aspects may be applied to other systems of like character such as the so-called "wired radio" receiving systems, electrical phonograph recording and reproducing systems, and like amplifying systems.

I claim:

1. In a system of the character described, a source of alternating current, a rectifier connected thereto and adapted to deliver a pulsating unidirectional current, a pair of condensers across the output circuit of said rectifier, a reactance in one side of the output circuit and between the condensers, a plurality of cascaded amplifier tubes having plates and filaments and said tubes being adapted to be operated at different plate voltages, parallel connections between said plates and the one side of said output circuit, one of said connections including a resistance, and a connection between a point of common potential in the filaments of said tubes and the other side of said output circuit.

2. An amplifying system having three electrode vacuum tubes and circuits including audio frequency transformers connecting some of said tubes in cascade for audio frequency amplification, means for energizing the plate, grid and filament heating circuits of said tubes with energy derived from the same audio frequency alternating current source, said audio frequency transformers being so poled that hum producing fluctuations arising in succeeding tubes and circuits of the system are opposed by hum producing fluctuations arising in preceding tubes and circuits of the system, and means associated with the plate circuits of preceding tubes for limiting the degree of hum producing fluctuations arising therein.

3. An amplifying system having three electrode vacuum tubes and circuits including audio frequency transformers connecting some of said tubes in cascade for audio frequency amplification, means for energizing the plate, grid and filament heating circuits of said tubes with energy derived from the same source of audio frequency alternating current, the tube of a preceding stage being selected and energized to produce less filament hum than a tube or tubes of a succeeding stage or stages, and means associated with the plate circuits of preceding tubes for causing the hum producing fluctuations arising therein to be less than the hum producing fluctuations arising in succeeding tubes, said audio frequency transformers being so poled that hum producing fluctuations arising in succeeding tubes are opposed by the amplified fluctuations arising in lesser degree in preceding tubes.

4. An amplifying system having three electrode vacuum tubes and circuits including audio frequency transformers connecting some of said tubes in cascade for audio frequency amplification, means for energizing the plate circuits of said tubes from a source of potential fluctuating at audio frequency including means for reducing the plate potential of preceding tubes to lesser value than the plate potential of succeeding tubes, and means associated with said potential reducing means for increasing the degree of filtration of plate currents for preceding tubes over succeeding tubes, said transformers being so poled that the amplified lesser hum producing fluctuations of preceding tubes oppose the greater hum producing fluctuations of succeeding tubes.

5. An amplifying system having three electrode vacuum tubes and circuits connecting some of said tubes in cascade for audio frequency amplification, means including an electrical filter system for energizing the plate circuits of said tubes from a source of potential fluctuating at audio frequency, said filter system being substantially free from current load other than that required by the plate circuits of said tubes, and means in series with some of the connections of said plate circuits to said filter system for reducing the effective potentials therein.

6. An amplifying system having three electrode vacuum tubes and circuits connecting some of said tubes in cascade for audio frequency amplification, means including an electrical filter system for energizing the plate circuits of said tubes from a source of potential fluctuating at audio frequency, said filter system being substantially free from current load other than that required by the plate circuits of said tubes, means in series with one or more of the connections of plate circuits of preceding tubes to said filter system for reducing the effective potentials therein, and means associated with said potential reducing means for increasing the degree of filtration of currents applied to the plate circuits of said preceding tubes.

7. A plurality of thermionic devices connected in cascade and having anodes and cathodes, a power supply means therefor including a source of alternating current, a rectifier, and filtering means for the rectified current constructed to filter the anode current to one of said devices more effectively than the anode current to another of said devices.

8. A plurality of thermionic devices connected in cascade and having anodes and cathodes, one of said devices being connected and suitably energized to detect modulated high frequency carrier currents and another of said devices being more powerful and more powerfully energized than said first device and connected to amplify the currents of modulation detected by said first device, a power supply means for said devices including a source of alternating current, a rectifier, and filtering means for the rectified current constructed to filter the anode current to said detecting device more effectively than the anode current to said amplifying device.

9. A plurality of thermionic devices connected in cascade and having anodes and cathodes, a power supply means therefor including a source of alternating current, a rectifier, and filtering means for the rectified current constructed to filter the anode current to one of said devices more effectively than the anode current to another of said devices, said filtering means being substantially free from current drain other than that required for the anode currents of the thermionic devices of said cascade.

10. A plurality of thermionic devices connected in cascade and having anodes and cathodes, one of said devices being connected and suitably energized to detect modulated high frequency carrier currents and another of said devices being more powerful and more powerfully energized than said first device and connected to amplify the currents of modulation detected by said first device, a power supply means for said devices including a source of alternating current, a rectifier, and filtering means for the rectified current constructed to filter the anode current to said detecting device more effectively than the anode current to said amplifying device, said filtering means being substantially free from current drain other than that required for the anode currents of the thermionic devices of said cascade.

In testimony whereof, BENJAMIN F. MIESSNER has signed his name to this specification this 11th day of June, 1926.

BENJAMIN F. MIESSNER.

of modulation detected by said first device, a power supply means for said devices including a source of alternating current, a rectifier, and filtering means for the rectified current constructed to filter the anode current to said detecting device more effectively than the anode current to said amplifying device, said filtering means being substantially free from current drain other than that required for the anode currents of the thermionic devices of said cascade.

In testimony whereof, BENJAMIN F. MIESSNER has signed his name to this specification this 11th day of June, 1926.

BENJAMIN F. MIESSNER.

DISCLAIMER 1,834,414.—*Benjamin F. Miessner*, South Orange, N. J. ELECTRICAL AMPLIFYING SYSTEM. Patent dated December 1, 1931. Disclaimer filed March 1, 1934, by the patentee, the assignee, *Radio Corporation of America*, assenting.

Hereby enters this disclaimer to claims 7, 8, 9, and 10 in the said specification which are in the following words, to wit:

"7. A plurality of thermionic devices connected in cascade and having anodes and cathodes, a power supply means therefor including a source of alternating current, a rectifier, and filtering means for the rectified current constructed to filter the anode current to one of said devices more effectively than the anode current to another of said devices.

"8. A plurality of thermionic devices connected in cascade and having anodes and cathodes, one of said devices being connected and suitably energized to detect modulated high frequency carrier currents and another of said devices being more powerful and more powerfully energized than said first device and connected to amplify the currents of modulation detected by said first device, a power supply means for said devices including a source of alternating current, a rectifier, and filtering means for the rectified current constructed to filter the anode current to said detecting device more effectively than the anode current to said amplifying device.

"9. A plurality of thermionic devices connected in cascade and having anodes and cathodes, a power supply means therefor including a source of alternating current, a rectifier, and filtering means for the rectified current constructed to filter the anode current to one of said devices more effectively than the anode current to another of said devices, said filtering means being substantially free from current drain other than that required for the anode currents of the thermionic devices of said cascade.

"10. A plurality of thermionic devices connected in cascade and having anodes and cathodes, one of said devices being connected and suitably energized to detect modulated high frequency carrier currents and another of said devices being more powerful and more powerfully energized than said first device and connected to amplify the currents of modulation detected by said first device, a power supply means for said devices including a source of alternating current, a rectifier, and filtering means for the rectified current constructed to filter the anode current to said detecting device more effectively than the anode current to said amplifying device, said filtering means being substantially free from current drain other than that required for the anode currents of the thermionic devices of said cascade."

[*Official Gazette March 27, 1934.*]

DISCLAIMER 1,834,414.—*Benjamin F. Miessner*, South Orange, N. J. ELECTRICAL AMPLIFYING SYSTEM. Patent dated December 1, 1931. Disclaimer filed March 1, 1934, by the patentee, the assignee, *Radio Corporation of America*, assenting.

Hereby enters this disclaimer to claims 7, 8, 9, and 10 in the said specification which are in the following words, to wit:

"7. A plurality of thermionic devices connected in cascade and having anodes and cathodes, a power supply means therefor including a source of alternating current, a rectifier, and filtering means for the rectified current constructed to filter the anode current to one of said devices more effectively than the anode current to another of said devices.

"8. A plurality of thermionic devices connected in cascade and having anodes and cathodes, one of said devices being connected and suitably energized to detect modulated high frequency carrier currents and another of said devices being more powerful and more powerfully energized than said first device and connected to amplify the currents of modulation detected by said first device, a power supply means for said devices including a source of alternating current, a rectifier, and filtering means for the rectified current constructed to filter the anode current to said detecting device more effectively than the anode current to said amplifying device.

"9. A plurality of thermionic devices connected in cascade and having anodes and cathodes, a power supply means therefor including a source of alternating current, a rectifier, and filtering means for the rectified current constructed to filter the anode current to one of said devices more effectively than the anode current to another of said devices, said filtering means being substantially free from current drain other than that required for the anode currents of the thermionic devices of said cascade.

"10. A plurality of thermionic devices connected in cascade and having anodes and cathodes, one of said devices being connected and suitably energized to detect modulated high frequency carrier currents and another of said devices being more powerful and more powerfully energized than said first device and connected to amplify the currents of modulation detected by said first device, a power supply means for said devices including a source of alternating current, a rectifier, and filtering means for the rectified current constructed to filter the anode current to said detecting device more effectively than the anode current to said amplifying device, said filtering means being substantially free from current drain other than that required for the anode currents of the thermionic devices of said cascade."

[*Official Gazette March 27, 1934.*]